Aug. 17, 1965   J. M. KOMARMY   3,200,953
FILTER CARTRIDGE WITH PLEATED ELEMENT
Filed Oct. 8, 1962

INVENTOR.
Julius M. Komarmy
BY
Paul J. Reising
ATTORNEY

United States Patent Office 3,200,953
Patented Aug. 17, 1965

3,200,953
FILTER CARTRIDGE WITH PLEATED ELEMENT
Julius M. Komarmy, Flint, Mich., assignor to General Motors Corporation, Detroit, Mich., a corporation of Delaware
Filed Oct. 8, 1962, Ser. No. 229,014
3 Claims. (Cl. 210—457)

This invention relates to a liquid filter useful as an oil filter element in motor vehicles, a filter for dry cleaning fluids and the like. More particularly, the subject matter of this invention is an improved filter of the type incorporating as a filter element a continuous and therefore generally cylindrical shaped pleated membrane such as resin impregnated porous paper or the like.

Pleated membrane filters of the type described have been commonly used for vehicle oil filters and have proven generally satisfactory, the useful life for such a filter being on the order of 4,000 or 5,000 miles of vehicle operation. However, one of the difficulties which is a factor in limiting the useful life of such a filter structure is that after a few thousand miles of operation the outwardly extending apices of the pleats have some tendency to collapse due to the accumulation of dirt and due to the fluid pressure exerted against them. This results in a considerable reduction in the available effective filtration surface area and hence a reduction in filtration efficiency.

The present invention has as its principal object an improved pleated membrane filter which will provide greater filtration efficiency and a longer useful life. More specifically, it is an object of the invention to provide a filter wherein the pleated membrane has increased structural rigidity and hence greater assurance against any collapse of the pleats during filter operation.

Briefly, the above objects are accomplished in accordance with the invention by slightly bowing the pleats with respect to their longitudinal axis in a manner such that instead of being straight they are slightly curvilinear. The stressing of the pleats into a curvilinear form provides a greatly increased structural rigidity and better assures against their collapse. Hence, pleat collapse is no longer a significant factor as regards the efficiency or effective life of the filter and a considerable improvement is thereby attained.

Figure 1:
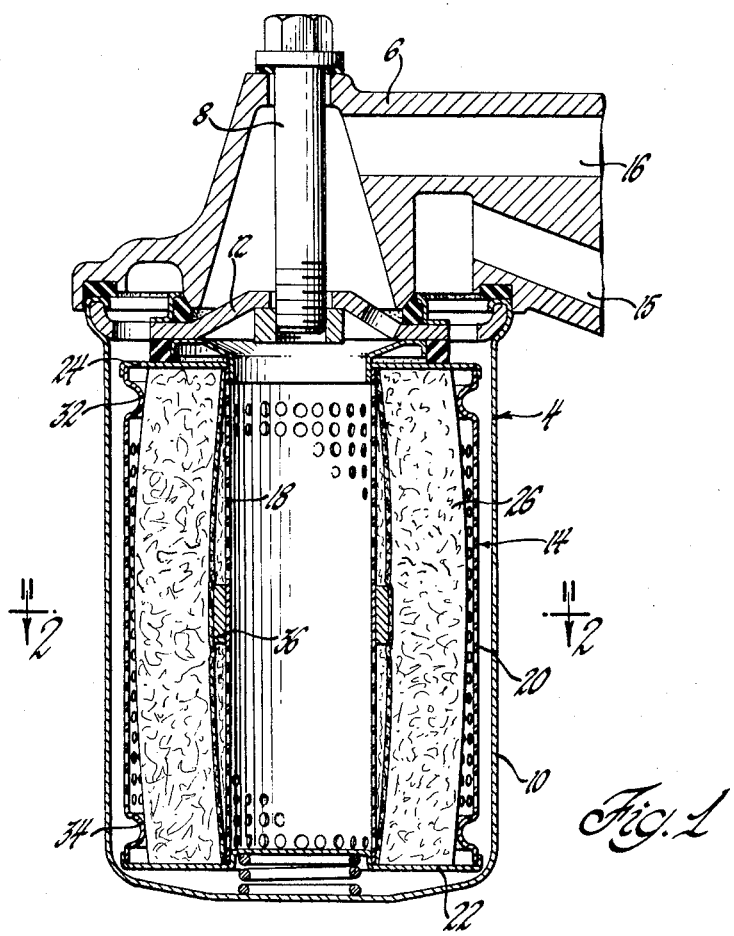
Figure 2:
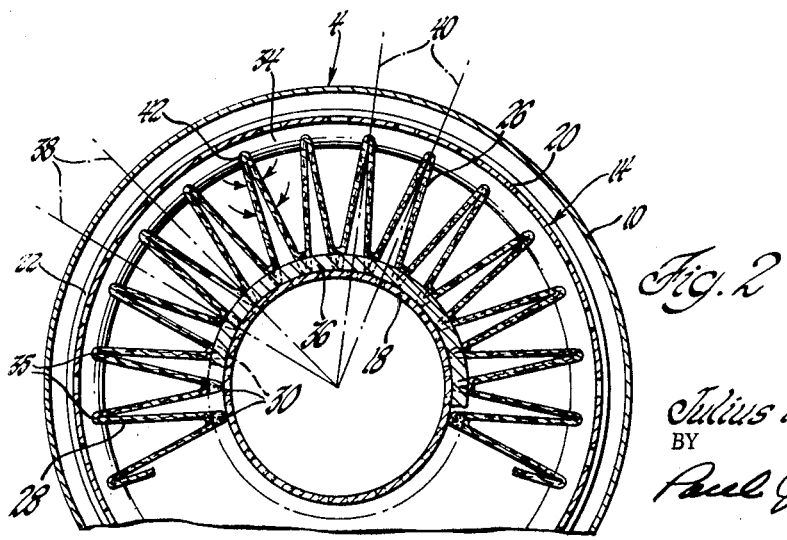

Other objects, features and advantages of the invention will appear more clearly from the following description of a particular embodiment thereof made with reference to the drawings in which:

FIGURE 1 is a side view in section of a filter constructed in accordance with the invention; and FIGURE 2 is a partial view taken on the line 2—2 of FIGURE 1.

Referring now to the drawings, the filter shown comprises a metal filter casing 4 of conventional structure which is removably connected to a metal top plate or support 6 by means of bolt 8. The casing comprises a sheet metal can 10 having the upper portion thereof crimped over and retaining an apertured disk 12 which together with the closed lower portion of the can provides a closed compartment for housing a filter cartridge 14. An oil inlet 15 in the top plate communicates with the annular space between the outer wall of the can and the filter cartridge, and oil outlet 16 communicates with the center of the can. Hence, the oil is caused to flow radially inwardly through the filter cartridge to the center of the can and then upwardly and out through the outlet 16. As will be obvious to those skilled in the art, the detailed structure of the metal casing, including the gaskets and cooperating structure which provide a sealed detachable connection between the can and the top plate, is conventional and hence requires no further description.

The filter cartridge 14, in which the present invention resides, comprises a perforated center tube 18 concentrically positioned with respect to a perforated cylindrical housing 20 by a generally disk shaped metal bottom plate 22 and an annular metal top plate 24 both of which extend between and secure the center tube to the outer housing. The annular space between the center tube and the perforated housing accommodates a vertically pleated sheet of porous resin impregnated paper 26 formed to a generally annular shape, the ends of the paper being secured together in sealed relationship as indicated at 28. The inner apices 30 at the top and bottom of the pleated filter paper are held against the center tube by inwardly extending circumferential grooves 32 and 34 which are formed in the top and bottom portions respectively of the outer housing 20 and which bear against the outer apices 35 of the pleats. Further in accordance with the invention, a ring 36 which can be of metal, plastic, pressed paper or the like is fitted around the middle of the center tube 18 and bears against the inner apices of the paper pleats at this point. Thus, the ring 36 exerts pressure against the inner apices along lines of force 38 while the annular grooves 32 and 34 exert pressure against the outer apices along lines of force 40 all of which pass through the longitudinal axis of the filter cartridge. Hence, the ring 36, in combination with the annular grooves 32 and 34, stresses the pleats outwardly at their center such that they assume a bowed shape and such that the pleated filter paper assumes a slightly barreled shape. This bowing adds considerable rigidity to the pleats and provides the structural strength required to assure against collapse at the apices of the pleats from the pressure exerted thereon by the flow of oil as indicated by the arrows in FIGURE 2 with respect to pleat 42. The extent to which the pleats are required to be bowed to provide this improved rigidity is exaggerated in the drawing for purposes of illustration; the amount of bowing actually required is easily accommodated without kinking by the inherent flexibility of the paper. In practice, it will be found that the greater the receptiveness of the filter medium to take a bow without kinking, the more bowing required to provide optimum rigidty. Hence, in general, it is desirable that the pleats be bowed to the fullest extent without causing any kinking.

It will be understood that while in the embodiment shown the pleated sheet 26 serves as the only filter medium in the filter, additional filter media can be included if desired; for example, to form a depth type filter, fibrous material or the like can be placed between the perforate housing and the outer surfaces of the pleats or between the perforate center tube and the inner surfaces of the pleats. Also, if desired, the mean diameter at one end of the element can be greater than that at the other end such that the overall shape of the element instead of being that of a bulged cylinder as shown, would be generally frusto-conical but with the bowed pleats providing slightly outwardly bulged sidewalls. Hence, while the invention has been described in detail by reference to a particular embodiment thereof, it should be understood that various changes and modifications may be made, all within the full and intended scope of the claims which follow.

I claim:

1. A filter cartridge comprising a perforated tube, a filter element surrounding said tube comprising a continuous sheet of a filter medium consisting of longitudinal pleats, all of said pleats extending across said sheet and having their inner apices pointing radially inwardly toward said tube and their outer apices pointing radially outwardly from said tube, an annular member around the top and an annular member around the bottom of said filter paper each bearing against the outer apices of said pleats, a ring around the center portion of said tube bearing against the inner apices of said pleats, and said annular members and said ring cooperating to bow each of said pleats outwardly to a curvilinear shape.

2. A filter cartridge comprising a perforated housing member and a perforated tube member coaxially arranged, impermeable end plates connecting said members and cooperating therewith to define an annular chamber, one of said end plates having a central discharge opening, a sheet of filter medium formed into pleats each having an acute angle narrow apex extending from one of said end plates to the other, retaining means surrounding and contacting the outer perimeter of each end of said pleated sheet, annular shoulder means interposed between an intermediate portion of said tube member and said pleated sheet and extending into said annular chamber, and said retaining means and annular shoulder means exerting pressure in radial directions against said pleated sheet and causing each of said pleats to be bowed with respect to the axis of the said members.

3. A filter cartridge as set forth in claim 2, said sheet being continuous in extending around said perforated tube and each of said pleats having the length of its apex extending close to the interior wall of said housing member and thereby substantially occupying a cross sectional and radially extending area defined by said annular chamber.

References Cited by the Examiner
UNITED STATES PATENTS

| | | | |
|---|---|---|---|
| 1,303,438 | 5/19 | Wiehl et al. | 210—493 |
| 2,902,163 | 9/59 | Humbert | 210—493 |

REUBEN FRIEDMAN, *Primary Examiner.*

HERBERT L. MARTIN, *Examiner.*